(12) United States Patent
McCauley et al.

(10) Patent No.: US 6,472,786 B1
(45) Date of Patent: Oct. 29, 2002

(54) BEARING PROTECTION ASSEMBLY FOR MOTORS

(75) Inventors: Daniel F. McCauley, Kent; David B. Finkenbinder, Ravenna; Daniel L. Kirtz, Stow, all of OH (US)

(73) Assignee: Ametek, Inc., Kent, OH (US)

( * ) Notice: Subject to any disclaimer, the term of this patent is extended or adjusted under 35 U.S.C. 154(b) by 0 days.

(21) Appl. No.: 09/716,145

(22) Filed: Nov. 17, 2000

(51) Int. Cl.$^7$ .............................. H02K 5/16; F16C 17/06
(52) U.S. Cl. ........................ 310/90; 384/151; 277/380
(58) Field of Search ............................. 310/90; 384/94, 384/129, 130, 138–141, 144, 147, 148, 151, 152, 299, 300, 477, 479, 480; 277/380, 381, 384, 394, 396, 397, 407, 946

(56) References Cited

U.S. PATENT DOCUMENTS

| | | | | |
|---|---|---|---|---|
| 1,931,733 A | * | 10/1933 | Leibing | 286/7 |
| 3,626,221 A | * | 12/1971 | Anderson et al. | 310/90 |
| 3,787,105 A | * | 1/1974 | Gardner | 308/73 |
| 3,916,231 A | * | 10/1975 | Cathey | 310/62 |
| 6,241,591 B1 | * | 6/2001 | Jackson et al. | 451/287 |

* cited by examiner

*Primary Examiner*—Nestor Ramirez
*Assistant Examiner*—Dang Dinh Le
(74) *Attorney, Agent, or Firm*—Renner, Kenner, Greive, Bobak, Taylor & Weber

(57) ABSTRACT

A bearing protection assembly protects a motor having a rotating shaft. The motor includes a bearing carried on the shaft, having one side proximal the motor and one side distal the motor. A support member is positioned adjacent the bearing's distal side and disposed about the shaft. A retaining member is disposed about the shaft, the retaining member and the support member and forms an annular cavity about the shaft. A non-lubricated seal is captured and may be compressed in the annular cavity precludes migration of moisture toward the bearing along the shaft. The seal is preferably made of expanded polytetrafluoroethylene. Alternative embodiments allow the seal to be positioned and secured in various ways with respect to the bearing.

17 Claims, 4 Drawing Sheets

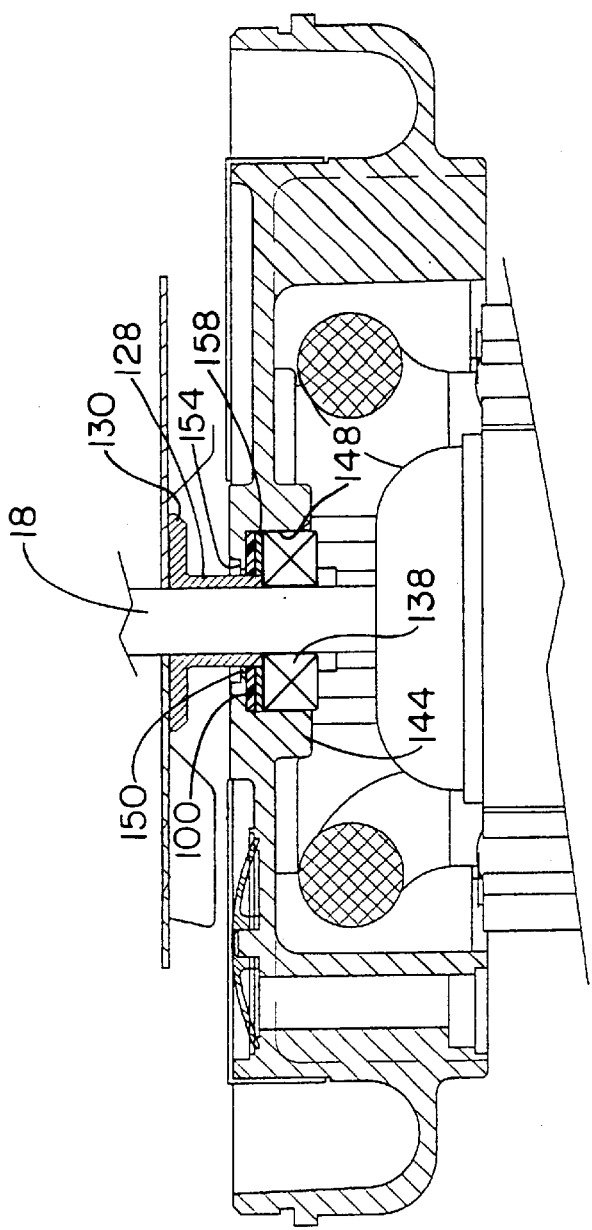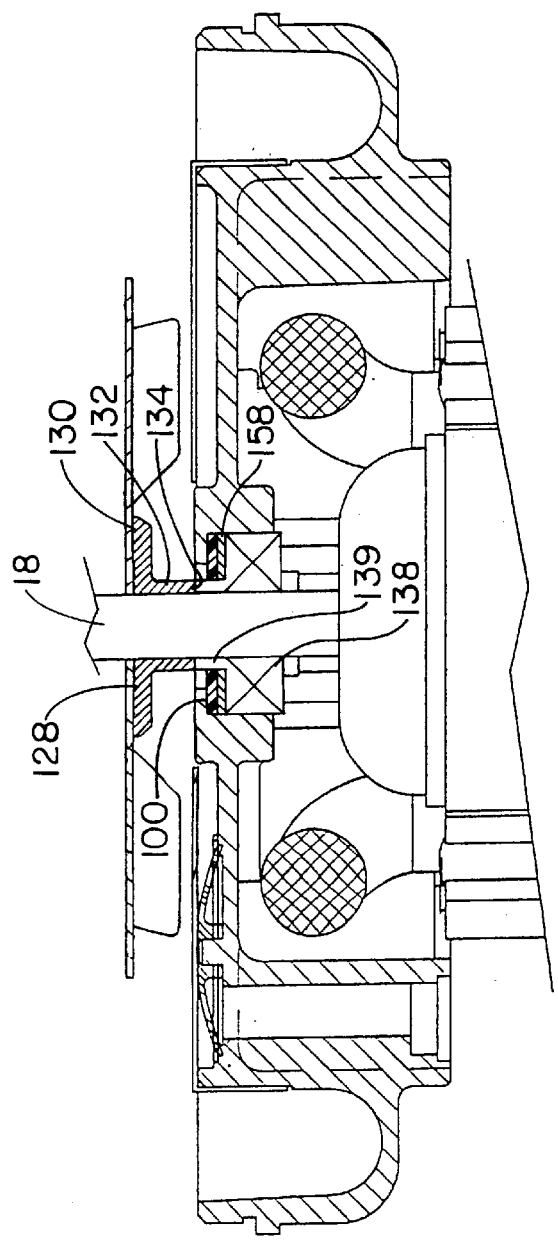

BEARING PROTECTION ASSEMBLY FOR MOTORS

TECHNICAL FIELD

The invention herein resides in the art of bypass vacuum motors. Specifically, the invention relates to bearing protection systems for bypass motors that are utilized with water pick-up vacuum cleaners such as used for picking up spills or water-based carpet cleaners. In particular, the invention relates to a bearing protection system that prevents water or moisture-laden air from contacting a bearing and wherein the protection system does not contaminate the working air used to operate the vacuum system.

BACKGROUND ART

Presently, some types of cleaning equipment are subjected to water or moisture. In particular, wet/dry vacuum cleaners, such as those known as utility vacs and carpet extractors, operate in an environment in which the debris that is extracted from the surface being cleaned is laden in a mixture of air and water. In order to prevent the moisture-laden air from entering the vacuum generating motor, bypass motors are typically used. As is well known, a bypass motor/fan assembly is one in which the working air, generated by a working air fan, is moved by the motor, but is totally isolated therefrom. The motor itself has a separate motor cooling air fan which draws cooling air over the motor's armature and field. In any event, the working air and the motor cooling air take totally separate paths and do not mix—except possibly in an exhaust area.

Bypass motors typically have a working air fan at an end of a motor/fan shaft, with the fan rotating within a fan shell. One end of the fan shell has an air intake, with the circumference or periphery of the shell having a plurality of spaced-apart exhaust apertures or a tangential exhaust tube. The intake aperture communicates with a vacuum chamber in the cleaning device, while the exhaust ports communicate with the ambient air. The fan shell defines a chamber in which the fan rotates. Once that chamber becomes pressurized, the air therein eventually finds it way to the exhaust ports. Accordingly, the working air fan takes the moisture-laden air from the vacuum chamber and disperses it to the ambient air.

It has been found, especially in applications where moisture is prevalent in the working air, that the moisture migrates into the motor housing and causes failures. In particular, these failures typically occur where the shaft is journaled within a bearing. The moisture contacts the bearing and eventually causes lubricating-grease degradation and loss, rust, and which, in turn, causes the bearing to fail and, in turn, the motor shaft to lock up and burn out the motor.

There have been numerous design modifications attempted to prevent moisture from entering the bearing area. One modification utilizes a grease and/or oil-lubricated synthetic rubber seal disposed on the shaft between the airflow path and the bearing. The lubricant is required as the motor shaft typically rotates at very high speeds. But, the moisture-laden air may have a certain amount of very strong detergent that emulsifies the grease, drying out the lubricating material, and attacking the seal so that moisture eventually migrates along the shaft to the bearing. Moreover, the detergent mixes with the lubricating oil and is then exhausted out the ambient exhaust ports, causing dirt spots or oil spots on the floor upon which the cleaner is used. This is quite upsetting to the user and considered a major product failing of the cleaner. Accordingly, use of synthetic rubber seals as a bearing protection system has been found to be somewhat ineffective.

An alternative modification is the use of a spring-loaded carbon-graphite-on-ceramic seal. These are typically only used on speciality lower-speed applications where exhausting ofthe seal-wear-debris is not an issue. As the carbon-graphite-on-ceramic seals wear down, they tend to "dust," allowing fine, dark debris to potentially stain the area being cleaned.

One of the more effective alternatives for sealing a working air fan from the motor is to use an air seal bearing protection system. This system utilizes a positive pressure in the area of the bearing, such that contaminants that are in the working air path are kept away from the bearing. This system has been proven to enhance overall life of the bearing. In such a system, air enters through a hole in the fan bracket drawn in by a separate fan. This creates a velocity pressure around the lower (fan end) bearing of the motor and keeps moisture away from the bearing during operation. The air enters behind a baffle and, as it exits, the velocity and pressure in that area keeps moisture away from the bearing. A rubber check valve keeps moisture from getting back into the motor in static or non-operating conditions. Although the air seal bearing protection system has been shown to be effective, it requires enlargement and lengthening of the motor housing and, thus, a significant increase in tooling costs.

Based upon the foregoing, it is evident that there is a need in the art for a dry seal—one without an oil-based lubricant—that is long-lasting, effective, and if the seal breaks down, does not expel dust or particulate that damages the surface being cleaned.

DISCLOSURE OF INVENTION

It is thus an object of the present invention to provide a bearing protection assembly for motors.

It is another object of the present invention to provide an assembly used with motors that have a rotating shaft journaled in a bearing, wherein the shaft rotates a working air fan which generates a working air flow that is maintained separate from the bearing and the motor. It will be appreciated that this separation may be accomplished with a fan end bracket that may or may not be coupled to a diffuser.

It is a further object of the present invention to provide an assembly, as above, in which a dry, non-lubricated seal is secured between a clamping member and a support member to significantly increase the useful life of the bearing and, thus, the motor. The inner diameter of the seal will at least frictionally engage the outer diameter of the rotating shaft or related rotating member.

It is yet another object of the present invention to provide an assembly, as above, in which the dry, non-lubricated seal may be made of a material such as expanded polytetrafluoroethylene, which is impervious to water and cleaning materials and, moreover, which does not break down after excessive wear.

It is yet another object of the present invention to provide an assembly, as above, in which the outer periphery ofthe seal is compressed to enlarge the inner periphery ofthe seal to increase contact with the rotating shaft.

It is still another object of the present invention to provide an assembly, as above, wherein the seal is positioned between the bearing and the working air path. The seal may be positioned so that its inner diameter is in parallel or perpendicular contact with the rotating shaft, depending upon which positioning provides the best performance for the motor assembly.

The foregoing and other objects of the present invention, which shall become apparent as the detailed description proceeds, are achieved by a bearing protection assembly for a motor having a rotating shaft, the assembly including a bearing carried on the shaft, the bearing having one side proximal the motor and one side distal the motor, a support member adjacent the bearing's distal side and disposed about the shaft, a clamping member disposed about the shaft, the clamping member and the support member forming an annular cavity about the shaft, and a non-lubricated seal captured in the annular cavity, the seal precluding migration of moisture toward the bearing along the shaft.

Other aspects of the present invention are attained by a motor assembly having a bearing protection system, including a motor having a rotatable shaft, a bracket holding the bearing to the shaft, a clamp secured to the bracket, and a seal captured between the bracket and the clamp, the seal preventing moisture from migrating to the bearing.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 3A is a fragmented elevational view, in partial cross-section, of another alternative bearing protection system of the present invention;

FIG. 3B is a fragmented elevational view, in partial cross-section, of yet another alternative embodiment of the present invention;

PREFERRED EMBODIMENT FOR CARRYING OUT THE INVENTION

Figure 1:
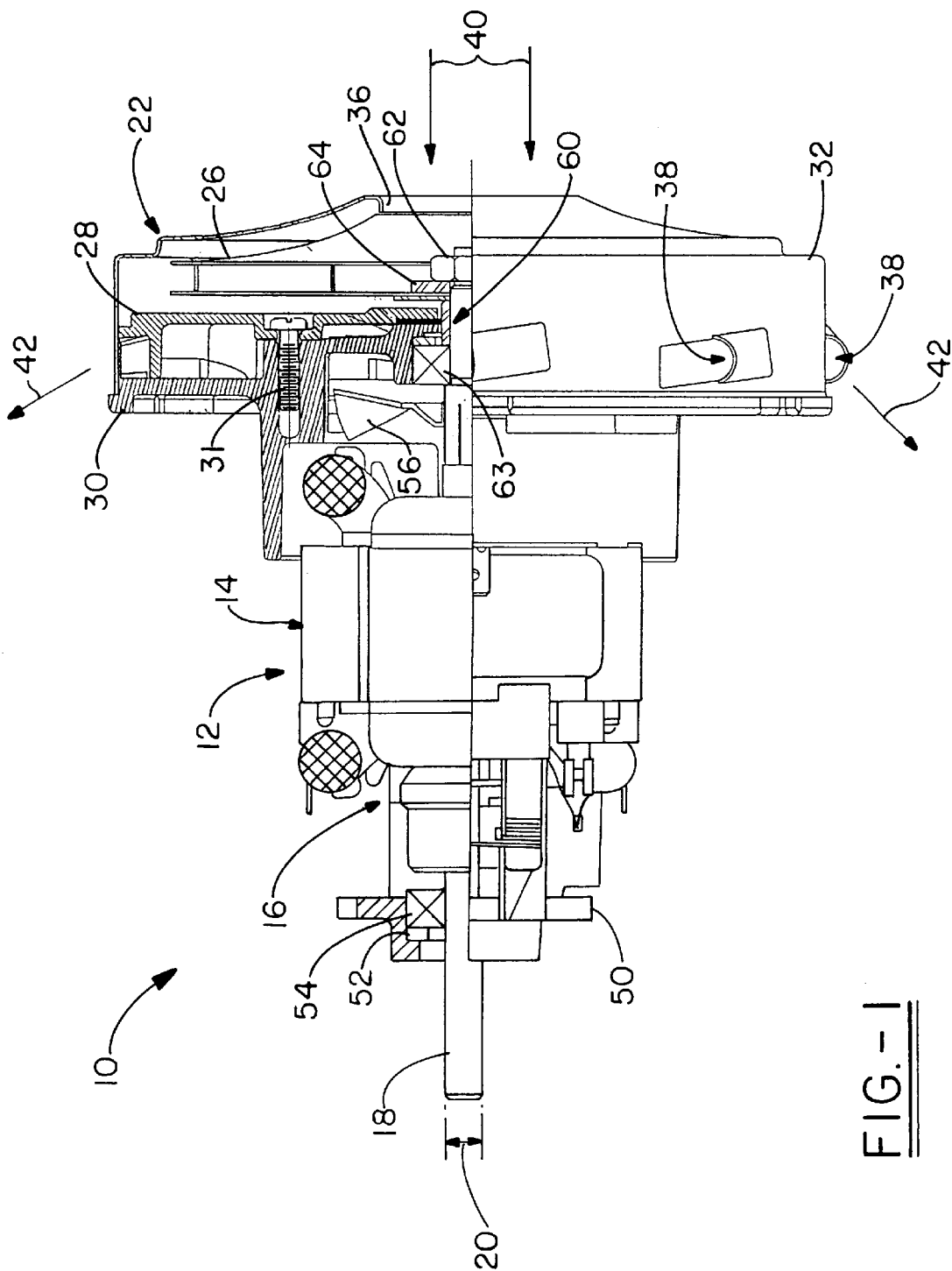
FIG. 1 is an elevational view of a motor assembly, in partial cross-section, made in accordance with the present invention.

A bypass motor assembly, made in accordance with the concepts of the present invention, is indicated generally by the numeral 10 in FIG. 1. The motor assembly 10 includes a motor 12 which provides a field 14 in operative relationship with an armature 16. The motor 12 rotates a shaft 18 when energized. The shaft 18 has an outer diameter 20 that is maintained with tight manufacturing tolerances.

The primary purpose of the bypass motor assembly 10 is to operate a working air fan assembly generally indicated by the numeral 22. The working air fan assembly 22 includes a working air fan 26 that is connected to the shaft 18. The assembly 22 may include a diffuser 28 that is attached to a fan end bracket 30 by a plurality of fasteners 31. A shroud 32 is disposed over the diffuser 28 and the end bracket 30 and encloses the working air fan 26. The shroud 32 includes an eye hole 36 at a centrally located position at one end of the shroud. A plurality of exhaust ports 38 are positioned around the outer periphery of the shroud 32. As the working air fan 26 rotates, working air, generally designated by the numeral 40, is drawn into the eye hole 36. The working air, depending upon the end use application, may contain moisture-laden air which includes cleaning solution and the like. The working air 40 is drawn in axially to the working air fan 26 and then radially expelled out the exhaust ports 38. It will be appreciated that the bypass motor assembly 10 may be vertically or horizontally oriented, depending upon the end use application. It has been found that when the motor assembly 10 is in a horizontal orientation, that the likelihood of moisture migrating along the shaft 18 is greatly increased, whereas in a vertical orientation, the moisture naturally migrates toward the eye hole 36 and away from the motor 12.

At the opposite end of the fan assembly 22 is a commutator end bracket 50 which surrounds the shaft 18. A load spring 52 is imposed between the commutator end bracket 50 and a commutator bearing 54 which is carried by the shaft 18. The motor assembly 10 may also include a cooling fan 56 which draws air over the field 14 and armature 16 so as to cool the motor 12 during operation. It will be appreciated by those skilled in the art that the cooling air generated by the cooling fan 56 is separate and apart from the working air moved by the working air fan 26.

Figure 2:
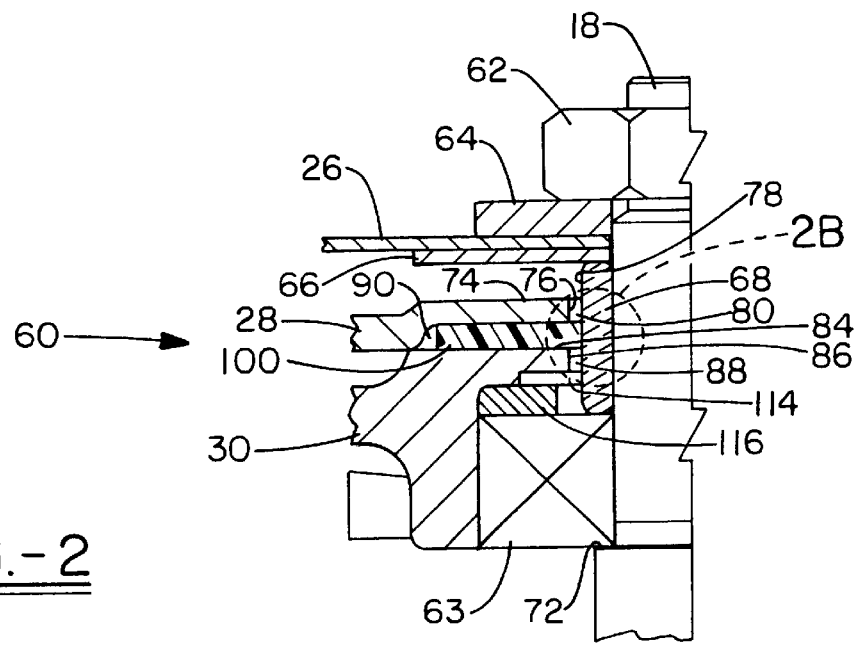
FIG. 2 is a detailed view of a bearing protection system, in partial cross-section, utilized with the motor assembly and made in accordance with the concepts of the present

As generally seen in FIG. 1 and as particularly seen in FIG. 2, a bearing protection system, designated generally by the numeral 60, is carried by the shaft 18 and positioned between the working air fan assembly 22 and the motor 12. A nut 62 secures the working air fan 26 to one end of the shaft 18. A fan washer 64 is interposed between the nut 62 and the lower fan disc blade of the fan 26. Accordingly, as the shaft 18 rotates, the working air fan 26 rotates in the same direction. A bearing 63 is disposed on the shaft 18 in a manner well known in the art. The bearing 63 functions to ensure the smooth and free rotation of the shaft 18 during operation. Interposed between the bearing 63 and the working air fan 26 along the shaft 18 are various elements of the bearing protection system 60 that ensure that any moisture-laden air moved by the working air does not migrate along the shaft or any other connected portion to interfere with the operation of the bearing 63. Accordingly, a fan washer 64 is disposed between the working air fan 26 and the nut 62. A shaft washer 66 is disposed on the underside of the working air fan 26 to provide structural support to the working air fan. A spacer 68 is disposed between the shaft washer 66 and the inner periphery of the bearing 63. It will be appreciated that the spacer 68 is press-fit onto the shaft 18 and, as such, is captured between the shaft washer 66 and the bearing 63 and rotates with the shaft 18 when the motor 12 is energized. If the moisture-laden working air is not expelled by the fan 26, it will likely accumulate between the underside of the fan and the diffuser 28. Accordingly, in this embodiment, any migration of moisture is along the outer diameter of the spacer 68 instead of the outer diameter of the shaft 18.

The bearing 63 is supported at its opposite inner periphery side or inner race by a shaft step 72. Accordingly, when the nut 62 is fastened, the bearing protection system 60 is captured between the nut 62 and the shaft step 72. The diffuser 28, which may be employed to assist in radially distributing the working air, as described above, includes a diffuser clamp ring 74 that is positioned about the outer diameter of the spacer 68. The diffuser clamp ring 74 may also be referred to as a clamping or retaining member. The diffuser 28 includes a diffuser inner diameter 76 which has a diameter greater than the spacer outer diameter 78. Accordingly, a diffuser gap 80 is provided between the inner diameter 76 and the outer diameter of the spacer 78.

The end bracket 30 includes an end bracket ring 84 which may also be referred to as a support member. The end bracket ring 84 includes an inner diameter 86 which provides a gap 88 between the inner diameter 86 and the spacer outer diameter 78. The end bracket ring 84 and the diffuser clamp ring 74 form a cavity 90 therebetween.

Figure 2B:
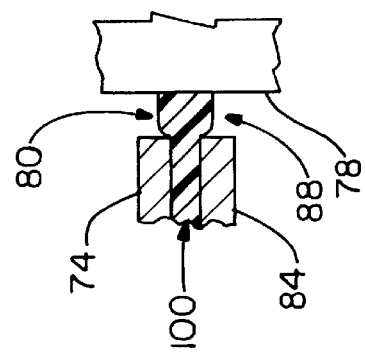
FIG. 2B is an exploded view of the seal under compression.
Figure 2A:
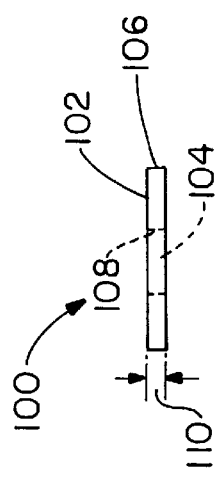
FIG. 2A is an elevational view of a seal used in accordance with the present invention.

A seal, designated generally by the numeral 100, is positioned in the cavity 90 and is retained or captured between the diffuser clamp ring 74 and the end bracket ring 84. The under the trade name Gore-Tex®. The seal 100 is dry inasmuch as it is not provided with a lubricating oil as is common with seals used to surround rotating parts. As best seen in FIG. 2A, the seal 100 is a relatively flat piece 102 which has a hole 104 therethrough. The seal 100 has an outer diameter 106 and an inner diameter 108 that is typically slightly smaller than the spacer outer diameter 78. The inner diameter as such provides an interference or friction fit around the spacer 78. The inner diameter is formed by either a die cut (punched), a laser cut, or high-pressure water-cut procedure. It will be appreciated by those skilled in the art that the inner diameter 108 must be concentric with the spacer outer diameter so that no gaps are provided between the inner diameter 108 and the outer diameter of the spacer, the shaft, or the part that it surrounds. The seal 100 may have a thickness 110 which is greater than the separation between the ring 74 and the ring 84. Those skilled in the art will appreciate that an E-PTFE seal is able to absorb high temperatures without deforming such that the rotation of the shaft will not adversely affect the sealing properties thereof. Moreover, the material is quite resilient and can withstand the various stresses and strains applied thereto. If the thickness 110 is slightly greater than the spacing between the rings 74, 84, the outer periphery of the seal will be slightly compressed when captured therebetween. As best seen in FIG. 2B, this compression causes expansion of the inner periphery of the seal into the diffuser gap 80 and the bracket gap 88 and further engagement with the spacer. This further facilitates the interference fit between the inner diameter of the seal and the outer diameter of the spacer. Disposed between the underside of the ring 84 is a support washer 114 which, in turn, is supported by a support washer cushion 116 that is disposed on the outer periphery or outer race of the bearing 63. Initial testing of the bearing protection system 60 reveals that bearing life is increased. It is believed that the seal material is able to deflect the moisture without any migration thereof along the spacer outer diameter. Moreover, the seal is made of a material which requires no lubricant and, therefore, will not degrade upon exposure to cleaning materials that may be carried by the moisture-laden air flowing through the working air fan. As such, the potential for damaging the surface to be cleaned from degraded seal lubricant or material is significantly reduced.

Figure 3:
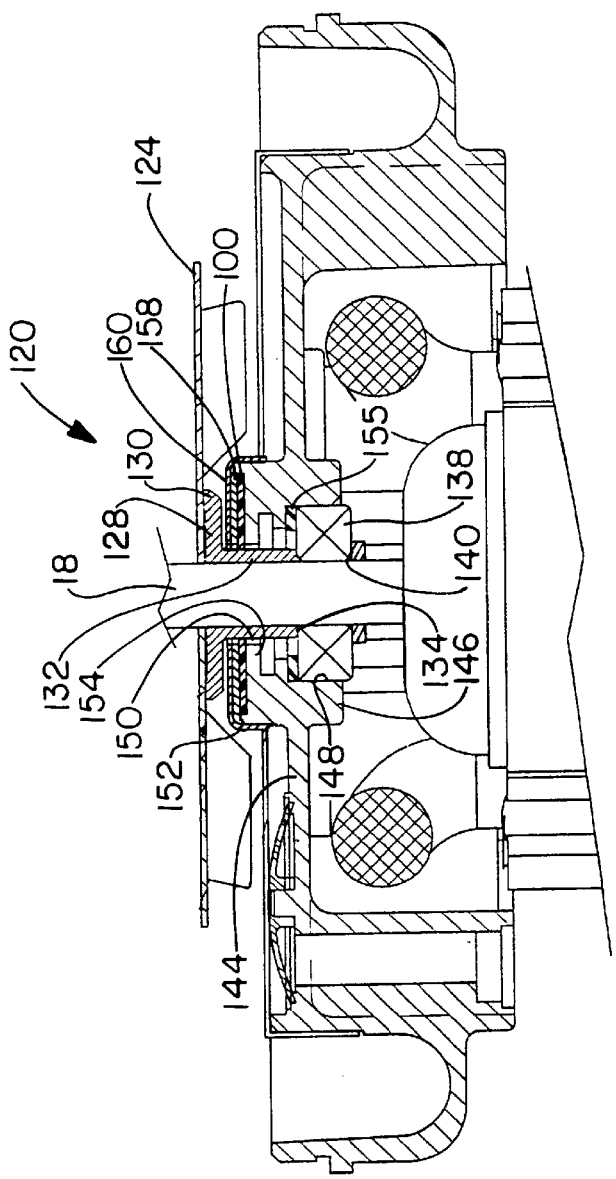
FIG. 3 is a fragmented elevational view, in partial cross-section, of an alternative bearing protection system of the present invention.

Referring now to FIG. 3, an alternative bearing protection system is designated generally by the numeral 120. As in the previous embodiment, the bearing protection system is secured to the motor shaft 18 by a locking nut (not shown).

In this embodiment, a spacer 128 includes a flange 130 that is positioned adjacent the underside of the fan. Opposite the flange 130 is a spacer end 134 which is supported by an inner periphery of a bearing 138. An opposite side of the inner periphery of the bearing 138 is supported by a shaft lip 140 which is part of the motor shaft 18.

A base bracket 144 holds the outer diameter of the bearing race 138. The inner race of the bearing 138 is pressed against the shaft 18. In particular, the base bracket 144 includes a hub 146 with a hub inner surface 148 that encloses a significant portion of the outer diameter of the bearing 138. The hub 146 forms a gap 150 between the shaft 18. The hub 146 also provides a hub outer surface 152 and an inwardly extending hub rim 154. A plurality of support cushions 155 may be interposed between the underside of the hub rim 154 and the outer periphery of the bearing 138. The seal 100 is disposed on the hub rim 154 which functions as a support member. A steel washer 158 is concentrically disposed on the seal 100. In order to capture the seal 100 and the washer 158, a clamping cap 160 is disposed thereover. The clamping cap 160 has a side 162 with an inner diameter slightly smaller than the hub outer surface 152. The clamping cap includes a flat member 164 which extends substantially perpendicular from the side 162 with a hole 166 extending therethrough that is larger than the outer diameter of the shaft 18. The clamping cap 160 secures the washer 158 and the seal 100 in place so that its inner diameter conforms to the outer diameter of the spacer 132. In other words, the cap 160 is press-fit onto the hub 146, to retain the seal 100 and the washer 158 in place. The washer 158 provides a flat uniform surface to assist in the clamping and compression of the seal's outer periphery. It will be appreciated that use of the steel washer 158 may not be required. This embodiment functions essentially the same as the previous embodiment, although the support configuration is slightly different.

Referring now to FIG. 3A, an alternative embodiment may be provided in which the support washer and the cap are not provided. In this embodiment, only the base bracket 144 is employed to clamp the seal 100 and the metal washer 158 which, in this embodiment, functions as a support member. The seal 100 may be slightly compressed so as to enhance the interference fit between its inner diameter and the outer diameter of the spacer 132.

The concepts of the present invention are also applicable to motor assemblies which use a bearing that has an elongated inner race 139. As best seen in FIG. 3B, the bearing 138 is positioned on the shaft 18 so that the end of the inner race 139 contacts the spacer end 134. The hub 146 captures the bearing 146 as in the previous embodiment. In this embodiment, the hub ring 154 captures the seal 100 and the washer 158 against the bearing 138. And, in particular, the seal's inner diameter 108 contacts the outer diameter of the elongated inner race 139. Thus, any moisture-laden air that contacts the spacer and the elongated inner race 139 is repelled by the seal 100.

Figure 4:
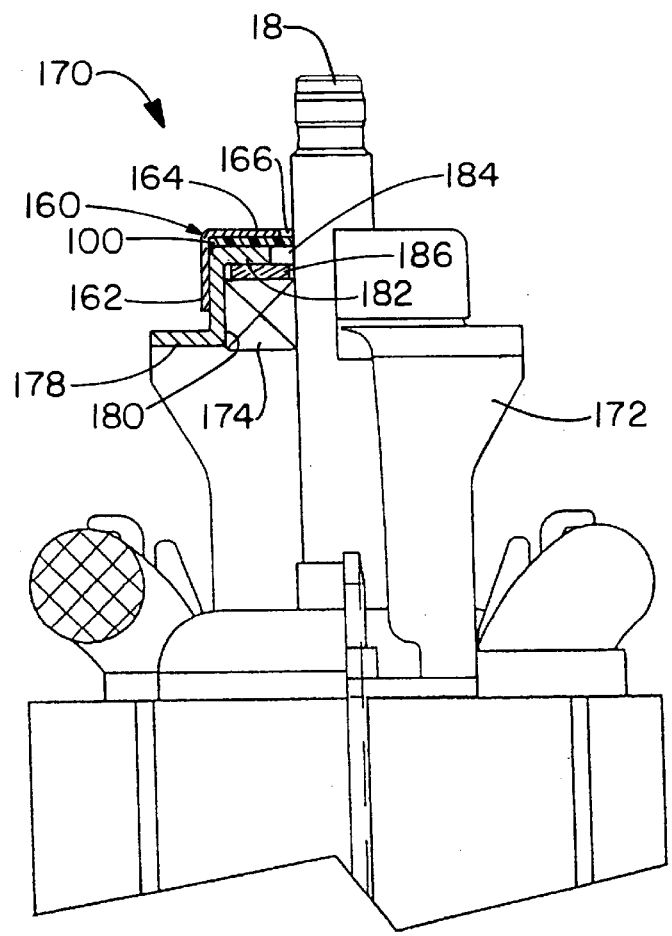
FIG. 4 is a fragmented elevational view, in partial cross-section, of still another alternative embodiment of the present invention.

Referring now to FIG. 4, yet another alternative bearing protection system is designated generally by the numeral 170. This embodiment is most likely used at the opposite end of the motor shaft near the motor commutator. Accordingly, the shaft 18 extends through a motor housing 172. A bearing 174 is press fit onto the outer diameter of the shaft 18. A base bracket 178 is disposed and secured to the housing 172 while also capturing the bearing 174. The base bracket 178 has a bearing surface 180 which maintains the bearing 174 against the shaft 18. The base bracket 178 also includes a step 182 that has a bracket hole 184 therethrough. Disposed between the step 182 and the outer diameter of the bearing 174 is a support cushion 186. The seal 100 is placed upon the outer surface of the step 182 and its inner diameter is positioned directly against the outer diameter of the shaft 18.

A clamping cap 160 is positioned on the base bracket 178 and, in particular, the step 182. The clamping cap 160 may slightly compress the thickness of the seal 100 and the inner diameter of the seal conforms to the outer diameter of the shaft 18 as described above.

Figure 5:
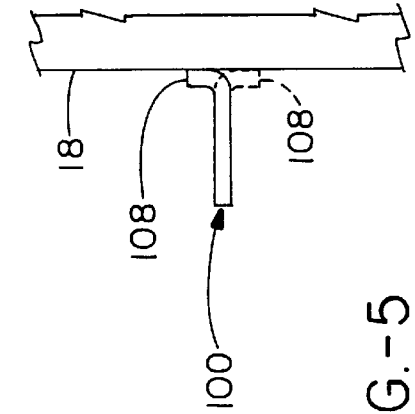
FIG. 5 is a detailed view showing the seal in an alternative positioning arrangement.

Although the embodiments have been described as having the inner diameter of the seal 100 substantially parallel with the outer diameter of the shaft 18 or other rotating member, it will also be appreciated that the inner diameter 108 could be positioned so as to be substantially perpendicular to the rotating member as seen in FIG. 5. Accordingly, the seal 100 would engage the shaft 18 with a portion of the flat surface of the seal 100. Of course, the inner portion of the seal could be deflected in either direction. It is believed that this configuration may provide more of a surface area engagement against the shaft and, thus, provide additional protection against migration of moisture along the shaft surface 18.

Based on the foregoing, the advantages of the bearing protection system are readily apparent. Primarily, the system effectively prevents moisture from entering into the motor assembly and especially the bearing. This has been found to significantly improve the life of the motor. The system also employs a material (E-PTFE) that is impervious to cleaning solutions, and has excellent thermal and dimensional stability. As such, the seal 100 does not degrade over time and will not directly damage a surface being cleaned by a device that uses a motor with the bearing protection system.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A bearing protection assembly for a motor having a rotating shaft, the assembly comprising:
    a bearing carried on the shaft, said bearing having one side proximal the motor and one side distal the motor;
    a support member adjacent said bearing's distal side and disposed about the shaft;
    a retaining member disposed about the shaft, said retaining member and said support member forming an annular cavity about the shaft; and
    a non-lubricated seal captured in said annular cavity, said seal precluding migration of moisture toward said bearing along the shaft,
    wherein said support member and said retaining member form gaps with respect to the rotating shaft, and wherein compression of said non-lubricated seal between said support member and said retaining member cause expansion of said seal into said gaps.

2. The assembly according to claim 1, wherein said non-lubricated seal has a thickness greater than the spacing between said support member and said retaining member, and said seal is at least slightly compressed between said support member and said retaining member and frictionally engages said shaft.

3. The assembly according to claim 2, wherein said support member is a base bracket that has a step with an outer diameter and wherein said retaining member is a cap securable to said step for capturing said non-lubricated seal therebetween.

4. The assembly according to claim 3, wherein said non-lubricated seal has a hole therethrough with an inner diameter that frictionally engages the outer diameter of the shaft.

5. The assembly according to claim 1, wherein said non-lubricated seal is expanded polytetrafluoroethylene.

6. The assembly according to claim 1, wherein said non-lubricated seal comprises:
    a flat piece having a hole therethrough that forms an inner edge, said inner edge positioned in a substantially parallel relationship with the shaft.

7. The assembly according to claim 1, wherein said non-lubricated seal comprises:
    a flat piece having a hole therethrough that forms an inner edge, said inner edge positioned in a substantially perpendicular relationship with the shaft.

8. The assembly according to claim 1, further comprising:
    a nut secured to the shaft;
    a spacer captured between said nut and said bearing, said spacer rotating with said shaft, said spacer having an outer diameter; and
    said non-lubricated seal having a hole therethrough with an inner diameter that frictionally engages said outer diameter of said spacer.

9. The assembly according to claim 8, wherein said support member and said retaining member form gaps with respect to said spacer, and wherein compression of said non-lubricated seal causes expansion of said seal into said gaps.

10. The assembly according to claim 9, further comprising:
    a support washer disposed between said support member and said bearing.

11. The assembly according to claim 8, wherein said support member is a hub that holds said bearing against the shaft, and wherein said retaining member is a cap securable to said hub for capturing said non-lubricated seal therebetween.

12. A motor assembly having a bearing protection system, comprising:
    a motor having a rotatable shaft;
    a bracket holding said bearing to said shaft;
    a clamp secured to said bracket; and
    a seal captured between said bracket and said clamp, said seal preventing moisture from migrating to said bearing,
    wherein said seal comprises a flat piece having a hole therethrough with an inner diameter, said flat piece having an inner periphery, wherein said clamp and said bracket compress said flat piece so as to increase the thickness of said flat piece at said inner periphery and decrease said inner diameter.

13. The assembly according to claim 12, wherein said seal is non-lubricated and moisture-proof.

14. The assembly according to claim 12, further comprising:
    a spacer carried by and rotatable with said shaft, said spacer having an outer diameter, and wherein said seal inner diameter is at least slightly smaller than said spacer's outer diameter for frictional engagement therewith.

15. The assembly according to claim 12, wherein said shaft has an outer diameter, and wherein said seal inner diameter is at least slightly smaller than said shaft's outer diameter for frictional engagement therewith.

16. The assembly according to claim 12, wherein said shaft has an outer diameter frictionally engaged by said seal's inner diameter.

17. The assembly according to claim 12, wherein said seal is expanded polytetrafluoroethylene.

* * * * *